Oct. 2, 1956
H. E. LEASH ET AL
2,764,837
CASTING SINKER FOR FISHING LINE
Filed Aug. 15, 1955
2 Sheets-Sheet 1
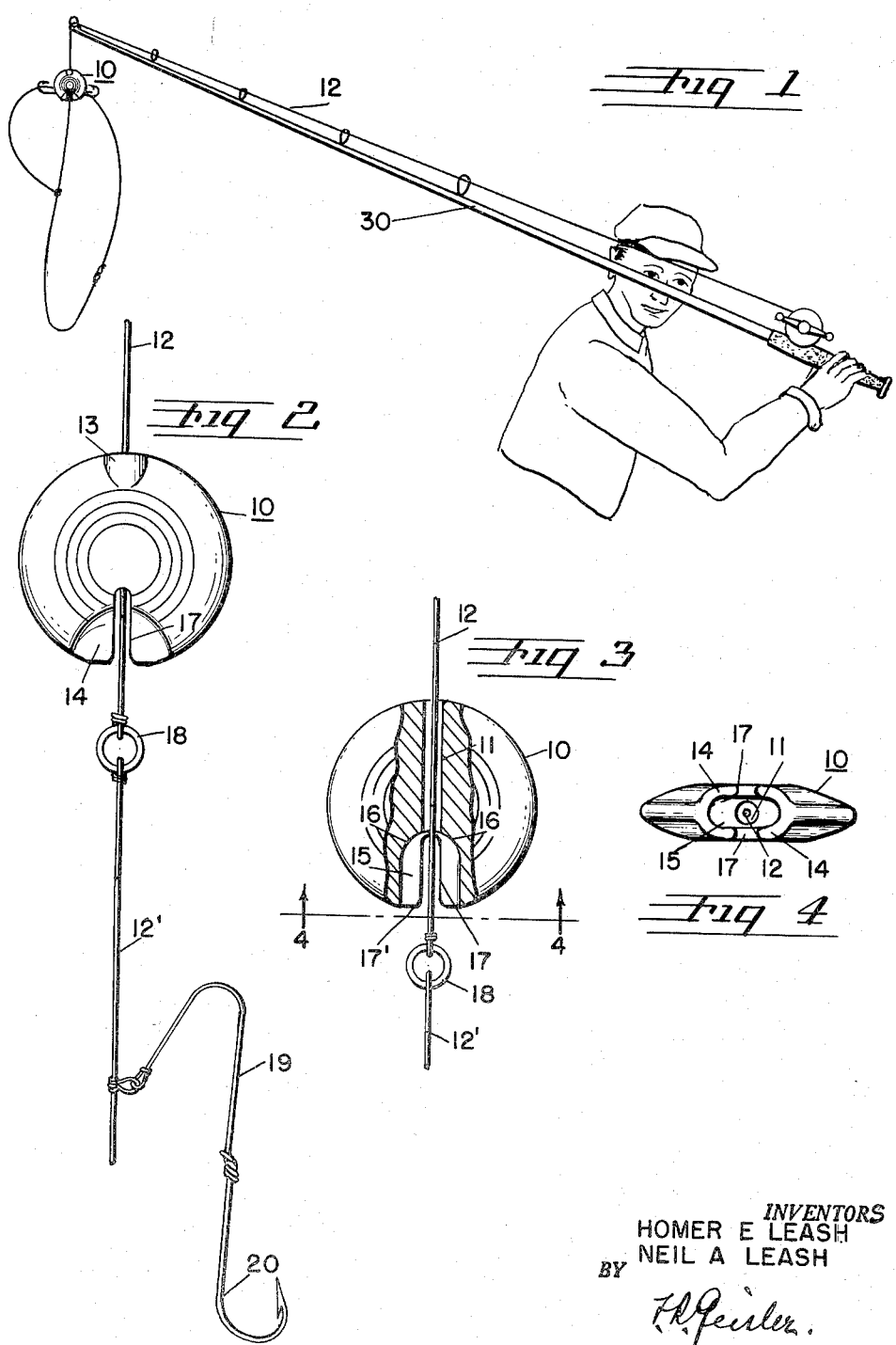
INVENTORS
HOMER E LEASH
NEIL A LEASH
BY
ATTORNEY Oct. 2, 1956
H. E. LEASH ET AL
2,764,837
CASTING SINKER FOR FISHING LINE
Filed Aug. 15, 1955
2 Sheets-Sheet 2
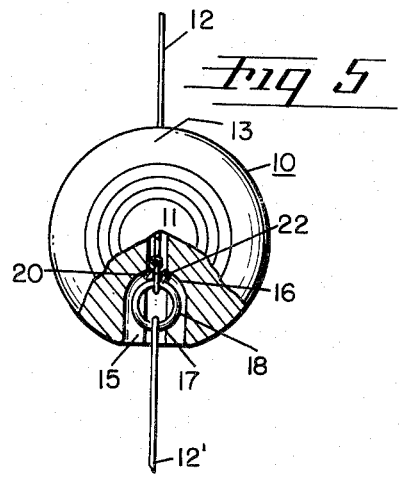
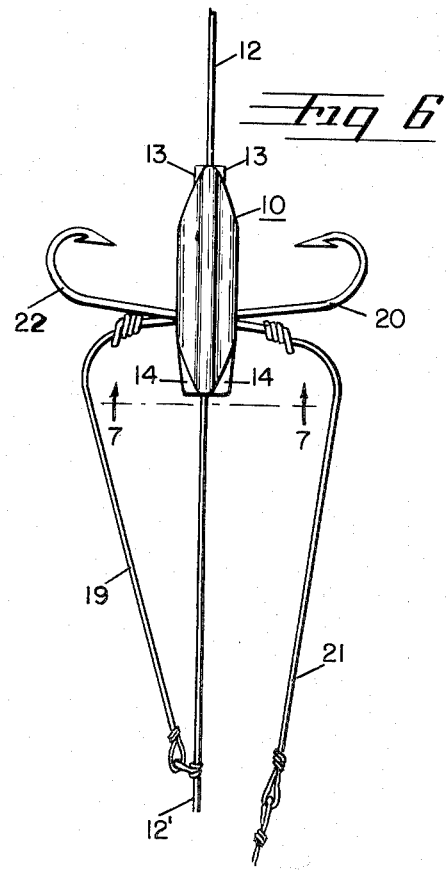
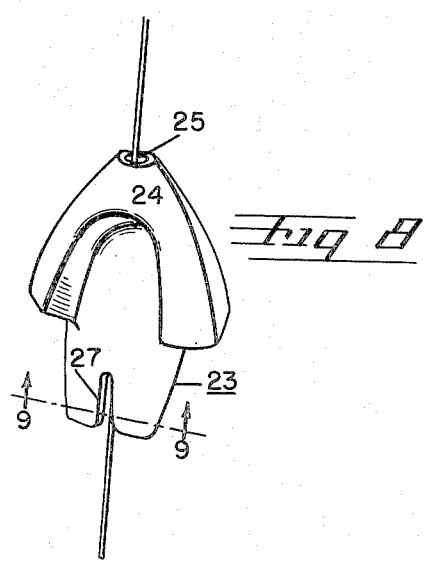
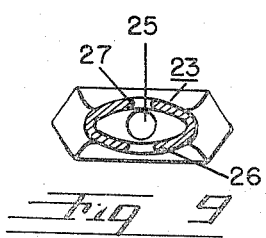
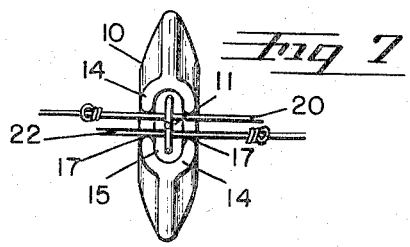
INVENTORS
HOMER E. LEASH
NEIL A. LEASH
BY
ATTORNEY

United States Patent Office 2,764,837
Patented Oct. 2, 1956

2,764,837
CASTING SINKER FOR FISHING LINE

Homer E. Leash, Sacramento, and Neil A. Leash, Fair Oaks, Calif.

Application August 15, 1955, Serial No. 528,265

6 Claims. (Cl. 43—44.9)

This invention relates to fishing line assemblies, and, more specifically, to such assemblies when arranged for the casting of baited hooks attached to a fishing line equipped with a sinker.

A fishing rod or pole, in addition to the fish line sinker, is a customary part of the casting assembly, although under certain conditions, the casting is sometimes done without the use of the rod. Accordingly the invention will be described in connection with the usual procedure wherein a casting rod is employed, even though the invention is not to be understood as necessarily limited to the use of a rod.

As is well known, in a fishing assembly equipped with a fish line sinker as well as with baited hooks, the hooks will be secured to the line, or more correctly to leaders which in turn are secured to the line, in such manner that the hooks will be spaced at various distances from the sinker. Thus, with the customary fishing assembly, when the line sinker is positioned at the tip of the rod preparatory to casting, the hooks themselves will nevertheless be spaced at from two to three feet, and often more, from the tip of the rod. The fact that several feet of line or leaders carrying the hooks will be swinging from the tip of the rod as the casting operation is started heretofore has involved certain familiar difficulties and hazards. For instance, considerable skill must be exercised to prevent snapping the bait off the hooks or the losing of the bait as the result of the familiar swish or whip-like action which may occur (and the intensity and speed of which is greater the further the hooks are spaced from the rod tip at the starting of the casting). Then there is the danger that the hooks will come into contact with nearby persons or with tree limbs or other obstructions during the casting operation, which danger is likewise increased the further the hooks are spaced from the rod tip. An additional difficulty to be avoided is having the swinging hooks becoming entangled with the line or leaders before hooks, line and sinker can reach the water.

The general object of the present invention is to eliminate or reduce these difficulties and hazards in the casting of the hooks and line.

A more specific object of the invention is to provide an improved fishing line assembly in which the hooks and the line sinker will be held close together, thus for example, at the tip of the rod, at the starting of the casting regardless of the distances at which the hooks will be spaced from the sinker and from each other when the hook and sinker finally are at their respective and relative intended positions in the water after the completion of the casting.

A related object is to provide an improved sinker for a fish line which will perform the additional function of furnishing temporary holding means for the hooks during the casting of the line, and then automatically allow the hooks to become spaced from the sinker when the sinker and hooks contact the water.

The manner in which these objects and other incidental advantages are attained with the present invention, the construction of the novel casting sinker constituting the essential part of the invention, and the manner in which the sinker and associated parts of the fishing assembly function in the course of the casting operation will be readily understood from the following brief description wherein reference is made to the accompanying drawings.

In the drawings:

Figure 1 is a view illustrating the entire fishing line assembly at the start of the casting operation;

Figure 2 is an enlarged side elevation of the sinker made in accordance with the present invention, the sinker being shown slidably mounted near the end of the fish line and separated from the hooks;

Figure 3 is a similar side elevation with a portion of the sinker broken away and shown in sectional elevation;

Figure 4 is an end elevation on line 4—4 of Figure 3;

Figure 5 is a side elevation of the same sinker, partly in section, illustrating a pair of hooks being temporarily held in the sinker;

Figure 6 is an elevation showing the sinker turned 90° from the position in Figure 5 and illustrating the hooks being temporarily held in the sinker;

Figure 7 is a bottom plan view on line 7—7 of Figure 6;

Figure 8 is a perspective view of a differently shaped sinker embodying the present invention; and Figure 9 is a plan section on line 9—9 of Figure 8.

In Figures 1 to 7 inclusive the casting fish line sinker, indicated in general by the reference character 10, consists of a substantially round disk-like body of metal decreasing in thickness at its periphery. The sinker is preferably formed of lead although any other metal or alloy which may be considered suitable for the ordinary fish line sinker may also be used.

A central bore or channel 11 (see Figure 3) extends diametrically through the sinker. The diameter of this channel 11 is considerably larger than the thickness of any fish line 12 on which the sinker would be used, so that the fish line can slide freely through the sinker when required to do so. The thickness of the periphery of the sinker is increased on both faces of the sinker in the area surrounding the ends of this channel, as shown at 13 and 14 in Figure 2, in order to provide adequate wall thickness for the channel at such points.

At one end the channel 11 is considerably enlarged in opposite directions parallel to the plane of the disk periphery. This enlarged channel portion 15 extends inwardly from the periphery for a distance less than one-half of the peripheral diameter and preferably from one-fourth to one-third of the peripheral diameter or channel length, as shown in Figure 3, the shoulders 16 at the inner termination of this enlarged channel portion are preferably rounded or concave (Figures 3 and 5).

A pair of identical slots 17, parallel to the center line of the channel 11, with their width corresponding approximately to the diameter of the main portion of the channel, are cut through the wall of the enlarged channel portion 15 on the two faces of the sinker respectively, these slots thus lying in a plane perpendicular to the plane of the sinker periphery. These slots extend inwardly for a distance not exceeding the length of the enlarged portion 15 of the channel and the outer ends of the walls of these slots preferably are rounded as indicated at 17'.

The fish line 12 is passed through the main portion of channel 11 and thence through the widened channel portion 15 and a ring 18 is secured to the end of the fish line beyond the sinker (Figures 2 and 3). The external diameter of ring 18 is less than the greater diameter of the widened channel portion 15 but greater than the diameter of the main portion of channel 11, and the thickness of this ring 18 is less than the diameter of the main channel portion. Consequently, when this ring 18 is secured to the fish line, after the line has been passed through the sinker 10, the ring 18 prevents the sinker from sliding off of the line. Also when the line is so held or supported that the sinker slides down into engagement with the ring 18 the ring can be received in the enlarged or widened portion 15 of the sinker channel and brought into engagement with shoulders 16. The purpose of such arrangement will presently be apparent.

In completing the fishing line assembly an additional piece 12' of the line is attached to the ring 18 and the leaders 19 and 21 for the hooks 20 and 22 respectively are secured to the line extension as usual. Assuming that the line 12 is carried on the fishing rod 30 and that the bait (not shown) has been placed on the hooks 20 and 22, the assembly is made ready for the casting by sliding the sinker 10 up a short distance from the ring 18, inserting the shanks of the hooks 20 and 22 transversely through the pair of slots 17, preferably on opposite sides, then pulling the line through the sinker until the ring 18 engages the hook shanks and holds them against the inner end walls of the slots 17 (as shown in Figures 5 and 6), and finally reeling in the line until the sinker, with the hooks held on the sinker, is at the tip of the rod 30. The assembly, then substantially in the position illustrated in Figure 1, is ready for the casting of the line.

Due to the pressure of the slidable sinker 10 against the hooks or hook shanks and ring 18 (which pressure will be increased by the centrifugal force to which the sinker is subjected during the casting swing), the hooks will temporarily be held firmly gripped in the sinker until the sinker strikes the water. The advantages of this are obvious, for, inasmuch as the sinker is carried near the tip of the rod 30 during approximately the first half of the casting swing, or until the hold on the line is released, the likelihood of the bait being snapped off from the hooks, or of the hooks coming into contact with nearby persons or with tree limbs or other objects, or the likelihood of the hooks, leaders and line becoming entangled during the casting swing, is greatly minimized.

When the sinker strikes the surface of the water its travel is suddenly checked sufficiently to cause the ring 18 and the hooks to move out from engagement with the sinker. This frees the hooks entirely from the sinker and ring. Then, when the sinker starts to sink, the lighter hooks will drift away to the extent permitted by the lengths of the leaders to which they are attached. If the line is given sufficient play it will even be caused to slide through the sinker channel 11 to some extent (depending upon the size of the sinker, the depth and current of the water, etc.), and, in any event, the baited hooks will be positioned in the water at desired distances from the sinker.

Many variations can of course be made in the size, shape and weight of the sinker employed in the carrying out of this invention without departing from the principle of the invention. The disk-like form of the sinker has been shown by way of illustration in Figures 1 to 7 inclusive since this form of sinker has been found to be very satisfactory, and is so simple, practical and inexpensive. Figures 8 and 9 show another shape of sinker embodying the invention which additional form of sinker has also proved satisfactory, especially for use in ocean surf or streams with swift currents. The sinker 23 of Figures 8 and 9 has an anchor-like end 24 to aid the sinker in resisting the drag of the water and increasing the sinker weight. This sinker 23 is provided with the necessary channel or bore 25, corresponding to the channel 11 of the sinker 10, and similarly the channel 25 has a widened end portion 26 capable of receiving, or partly receiving, a ring, such as the ring 18, or other engaging and hook-holding element, and similarly has a pair of identical parallel slots 27 in the opposite faces extending into the widened end of the channel.

Other shapes and forms of sinkers will suggest themselves and it is not intended to limit the invention except as provided in the claims. However, it is essential in the proper carrying out of the invention that the sinker be provided with a suitable bore or channel, extending through the sinker, of sufficient diameter to enable the fish line to slide freely through the sinker, that a cooperating engaging element be secured to the line beyond the sinker, and that the sinker and cooperating element be so arranged that between them they will be able to exert a temporary grip on the fish hooks when the line is pulled tight through the sinker at the start of the casting operation.

I claim:

1. In a fishing tackle casting assembly including a fish line, a casting line sinker having a channel extending through said sinker, said channel being of sufficient size to enable said line to slide freely in said channel, one end of said sinker having slots extending into the end of the wall of said channel parallel to the axial line of said channel, said line being inserted through said channel, an engaging element secured on said line beyond the slotted end of said sinker, said element being too large to be drawn through said channel, and a fish hook connected with said line beyond said engaging element, said slots being of sufficient size to receive the shank of said hook, whereby, when said hook shank is placed in said slots and said engaging element and said sinker are brought together, the weight of said sinker against said hook shank and engaging element, while said line and sinker are held in casting position, will cause said hook to be carried with said sinker until said sinker strikes the water and the pull on said line is slackened.

2. In a fishing tackle casting assembly including a fish line, a casting line sinker having a channel extending through said sinker, said channel being centrally positioned in said sinker and being of sufficient size to enable said line to slide freely in said channel, said channel being enlarged at one end, said sinker having slots extending inwardly from the end of the wall of said enlarged portion of said channel parallel to the axial line of said channel, said line being inserted through said channel and said enlarged portion thereof and terminating beyond said latter mentioned channel portion, an engaging element secured to said line beyond said sinker and enlarged channel portion, said element being too large to be drawn through said channel but capable of insertion into the enlarged end portion of said channel as far as the inner ends of said slots, and a fish hook connected with said line beyond said engaging element, said slots being of sufficient size to receive the shank of said hook, whereby, when said hook shank is placed in said slots and said engaging element and said sinker are brought together, the weight of said sinker against said hook shank and engaging element, while said line and sinker are held in casting position, will cause said hook to be carried with said sinker until said sinker strikes the water and the pull on said line is slackened.

3. In a fishing tackle casting assembly including a fish line, a casting line sinker having a channel extending through said sinker, said channel being centrally positioned in said sinker and being of sufficient size to enable said line to slide freely in said channel, said channel having a main portion and a widened portion at one end of greater length than width, said widened portion extending inwardly in the body of said sinker for a short distance, said sinker having slots extending inwardly from the end of the wall of said widened portion of said channel parallel to the axial line of said channel and located in a plane perpendicular to the plane of the greater length of said widened end portion of said channel, said line being inserted through said channel and said widened portion and terminating beyond said latter mentioned channel portion, a ring secured to said line beyond the slotted end of said sinker, said ring being too large to be drawn through said channel, the thickness of said ring being less than the width of said channel and the outside diameter of said ring being less than said greater length of said widened end portion of said channel but greater than the diameter of the main portion of said channel, and fish hooks connected with said line beyond said ring, said slots being of sufficient size to receive the shanks of said hooks, whereby, when said hook shanks are placed in said slots and said ring and said sinker are brought together, the weight of said sinker against said hook shanks and ring, while said line and sinker are held in casting position, will cause said hooks to be carried with said sinker until said sinker strikes the water and the pull on said line is slackened.

4. In a fishing tackle casting assembly the combination of a fish line, a casting sinker having a channel extending through said sinker, said channel being of sufficient size to enable said line to slide freely in said channel, said channel being enlarged at one end, said enlarged portion extending inwardly in the body of said sinker for a short distance, said sinker having a pair of slots extending inwardly from the end of the wall of said enlarged portion of said channel parallel to the axial line of said channel, said line being inserted through said channel and said enlarged portion thereof, an engaging element secured on said line beyond said sinker and latter mentioned channel portion, said element being too large to be drawn through said channel but capable of insertion into the enlarged end portion of said channel as far as the inner ends of said slots, and fish hooks connected with said line beyond said engaging element, said slots being of sufficient size to receive the shanks of said hooks, whereby, when said hook shanks are placed in said slots and said engaging element and said sinker are brought together, the weight of said sinker against said hook shanks and engaging element, while said line and sinker are held in casting position, will cause said hooks to be carried with said sinker until said sinker strikes the water and the pull on said line is slackened.

5. A fishing tackle casting assembly including a fish line, a casting rod secured to said line, a casting sinker having a channel extending through said sinker, said channel being centrally positioned in said sinker and being of sufficient size to enable said line to slide freely in said channel, said channel having a main portion and a widened portion at one end, said widened portion being of greater length than width and extending inwardly in the body of said sinker for a distance not exceeding one-half of the entire length of said channel, said sinker having a pair of slots extending inwardly from the end of the wall of said widened portion of said channel parallel to the axial line of said channel and located in a plane perpendicular to the plane of the greater length of said widened end portion of said channel, said line extending through said channel and said widened portion, a ring secured to said line beyond said sinker and said widened channel portion, the thickness of said ring being less than the width of said widened channel portion and the outside diameter of said ring being less than said greater length of said widened end portion of said channel but greater than the diameter of the main portion of said channel, and fish hooks connected with said line beyond said ring, said slots being of sufficient size to receive the shanks of said hooks, whereby, when said hook shanks are placed in said slots and said ring and said sinker are brought together, the weight of said sinker against said hook shanks and ring, while said sinker is positioned at the end of the fishing rod in casting, will cause said hooks to be carried with said sinker until said sinker strikes the water and the pull on said line is slackened.

6. A fishing tackle casting assembly including a casting rod, a fish line secured to said rod, a slidable sinker member on said line, said sinker member having a central channel extending therethrough of sufficient size to enable said line to slide freely in said channel, said line extending through said channel, a sinker-engaging and retaining member secured on said line beyond said sinker member, and a fish hook secured to said line a spaced distance beyond said retaining member, said sinker member having a slot of sufficient size to receive the shank of said hook and so positioned as to cause said hook shank also to be engaged by said retaining member when said hook shank is placed in said slot and said sinker and retaining members are brought into engagement with each other, whereby said hook can be held in said slot by said members when said members are positioned at the end of said rod for casting and will then continue to be so held during the casting until said members strike the water and the pull on said line is slackened.

References Cited in the file of this patent

UNITED STATES PATENTS

| | | |
|---|---|---|
| 1,713,041 | Fey | May 14, 1929 |
| 2,140,724 | Stefan | Dec. 20, 1938 |

FOREIGN PATENTS

| | | |
|---|---|---|
| 143,129 | Australia | Aug. 29, 1951 |